United States Patent
Whitehurst et al.

(10) Patent No.: US 10,408,068 B2
(45) Date of Patent: Sep. 10, 2019

(54) FAN BLADE DOVETAIL AND SPACER

(71) Applicant: United Technologies Corporation, Hartford, CT (US)

(72) Inventors: Sean A. Whitehurst, South Windsor, CT (US); Patrick James McComb, Naugatuck, CT (US); Christopher S. McKaveney, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 808 days.

(21) Appl. No.: 14/773,927

(22) PCT Filed: Feb. 18, 2014

(86) PCT No.: PCT/US2014/016830
§ 371 (c)(1),
(2) Date: Sep. 9, 2015

(87) PCT Pub. No.: WO2014/158447
PCT Pub. Date: Oct. 2, 2014

(65) Prior Publication Data
US 2016/0017727 A1    Jan. 21, 2016

Related U.S. Application Data

(60) Provisional application No. 61/777,118, filed on Mar. 12, 2013.

(51) Int. Cl.
*F01D 5/30* (2006.01)
*F01D 5/32* (2006.01)
(Continued)

(52) U.S. Cl.
CPC .......... *F01D 5/3007* (2013.01); *F01D 5/141* (2013.01); *F01D 5/323* (2013.01); *F01D 5/02* (2013.01);
(Continued)

(58) Field of Classification Search
CPC .......... F01D 5/02; F01D 5/141; F01D 5/3007; F01D 5/323; F01D 5/26; F01D 5/3046;
(Continued)

(56) References Cited

U.S. PATENT DOCUMENTS 2,317,338 A    4/1943    Rydmark
2,753,149 A *  7/1956    Kurti ..................... F01D 5/323
                                                            416/216

(Continued)

OTHER PUBLICATIONS

International Search Report and Written Opinion for International Application No. PCT/US2014/016830 completed on May 9, 2014.

(Continued)

*Primary Examiner* — Mark A Laurenzi
*Assistant Examiner* — Paul W Thiede
(74) *Attorney, Agent, or Firm* — Carlson, Gaskey & Olds, P.C.

(57) ABSTRACT

A blade according to an exemplary aspect of the present disclosure includes, among other things, a radially inner dovetail supporting a radially outer airfoil; and the dovetail having a radial thickness which is less in a circumferentially center portion of the dovetail than circumferentially opposing outer edges.

14 Claims, 4 Drawing Sheets

(51) Int. Cl.
*F01D 5/14* (2006.01)
*F01D 5/02* (2006.01)

(52) U.S. Cl.
CPC ...... *F05D 2220/32* (2013.01); *F05D 2220/36* (2013.01); *F05D 2230/60* (2013.01); *F05D 2240/30* (2013.01); *F05D 2250/711* (2013.01); *F05D 2250/712* (2013.01); *Y02T 50/671* (2013.01)

(58) Field of Classification Search
CPC ............ F05D 2220/32; F05D 2220/36; F05D 2230/60; F05D 2240/30; F05D 2250/711; F05D 2250/712; Y02T 50/671
USPC .............................. 416/219 R, 135, 216, 218
See application file for complete search history.

(56) References Cited

U.S. PATENT DOCUMENTS

| | | | |
|---|---|---|---|
| 4,022,545 A * | 5/1977 | Shank | F01D 5/26 416/135 |
| 4,820,126 A | 4/1989 | Gavilan | |
| 4,836,749 A * | 6/1989 | Gavilan | F01D 5/3046 416/218 |
| 5,100,292 A | 3/1992 | Matula et al. | |
| 5,236,309 A | 8/1993 | Van Heusden et al. | |
| 5,310,317 A | 5/1994 | Bailey et al. | |
| 5,474,423 A | 12/1995 | Seeley et al. | |
| 5,993,162 A * | 11/1999 | Weisse | F01D 5/323 416/219 R |
| 6,030,178 A | 2/2000 | Caruso | |
| 6,840,740 B2 | 1/2005 | Yehle et al. | |
| 8,047,796 B2 | 11/2011 | Riaz et al. | |
| 2004/0076523 A1 | 4/2004 | Sinha et al. | |
| 2010/0189564 A1 | 7/2010 | Stone | |
| 2012/0163986 A1* | 6/2012 | Darkins, Jr. | F01D 5/282 416/241 B |

OTHER PUBLICATIONS

U.S. Appl. No. 13/459,748, filed Apr. 30, 2012.
International Preliminary Report on Patentability for PCT Application No. PCT/US2014/016830, dated Sep. 24, 2015.
Supplementary European Search Report for Application No. 14774902.2 dated Oct. 25, 2016.

* cited by examiner

FAN BLADE DOVETAIL AND SPACER

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine, and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Individual fan blades are mounted within a hub or rotor driven by the gear assembly. The configuration and geometry of the fan blades balance propulsive efficiency with durability and fatigue requirements.

Although geared architecture have improved propulsive efficiency, turbine engine manufacturers continue to seek further improvements to engine performance including improvements to thermal, transfer and propulsive efficiencies.

SUMMARY

A blade according to an exemplary aspect of the present disclosure includes, among other things, a radially inner dovetail supporting a radially outer airfoil; and the dovetail having a radial thickness which is less in a circumferentially center portion of the dovetail than circumferentially opposing outer edges.

In a further non-limiting embodiment of the foregoing blade, a bottom surface of the dovetail decreases generally constantly from the circumferential edges to the central portion.

In a further non-limiting embodiment of any of foregoing blades, the bottom surface is concave.

In a further non-limiting embodiment of any of foregoing blades, the dovetail is formed of a higher quality material than the rotor and the bottom surface is concave such that the blade may fracture before the rotor.

In a further non-limiting embodiment of any of foregoing blades, the rotor is formed of a stronger material than the dovetail.

In a further non-limiting embodiment of any of foregoing blades, a bottom surface of the dovetail is furthest from a rotational axis of the rotor at the circumferential center.

In a further non-limiting embodiment of any of foregoing blades, a spacer is disposed radially between a radial inner surface of the dovetail and the rotor.

In a further non-limiting embodiment of any of foregoing blades, the spacer includes a radial outer surface matching a contour of at least a portion of the radial inner surface of the dovetail.

In a further non-limiting embodiment of any of foregoing blades, the blade is a fan blade.

A fan according to an exemplary aspect of the present disclosure includes, among other things, a fan rotor having a plurality of slots, with the slots each receiving a fan blade; and the fan blades including an airfoil extending radially outwardly of a dovetail, the dovetail having a radial thickness which is less in a circumferentially center portion of the dovetail than circumferentially opposing outer edges.

In a further non-limiting embodiment of the foregoing fan a bottom surface of the dovetail decreases generally constantly from the circumferential edges to the circumferentially central portion.

In a further non-limiting embodiment of any of the foregoing fans, the bottom surface is concave.

In a further non-limiting embodiment of any of the foregoing fans, the fan rotor is formed of a material that is stronger than a material forming the dovetail.

In a further non-limiting embodiment of any of the foregoing fans, a spacer is disposed radially between a radial inner surface of the dovetail and the fan rotor.

A method of interfacing a dovetail and a rotor according to another exemplary aspect of the present disclosure includes, among other things, providing a fan rotor with a plurality of slots, with the slots receiving a fan blade, and the fan blades including an airfoil extending radially outwardly of a dovetail, the dovetail having a radial thickness which is less in a circumferentially center portion of the dovetail than circumferentially opposing outer edges.

In a further non-limiting embodiment of the foregoing method, the method includes positioning a spacer radially between a radial inner surface of the dovetail and the rotor, the spacer loading against the radial inner surface during operation.

In a further non-limiting embodiment of any of the foregoing methods, a bottom surface of the dovetail is concave when the dovetail is not loaded.

These and other features of the present disclosure can be best understood from the following specification and drawings, the following of which is a brief description.

DETAILED DESCRIPTION

Figure 1:
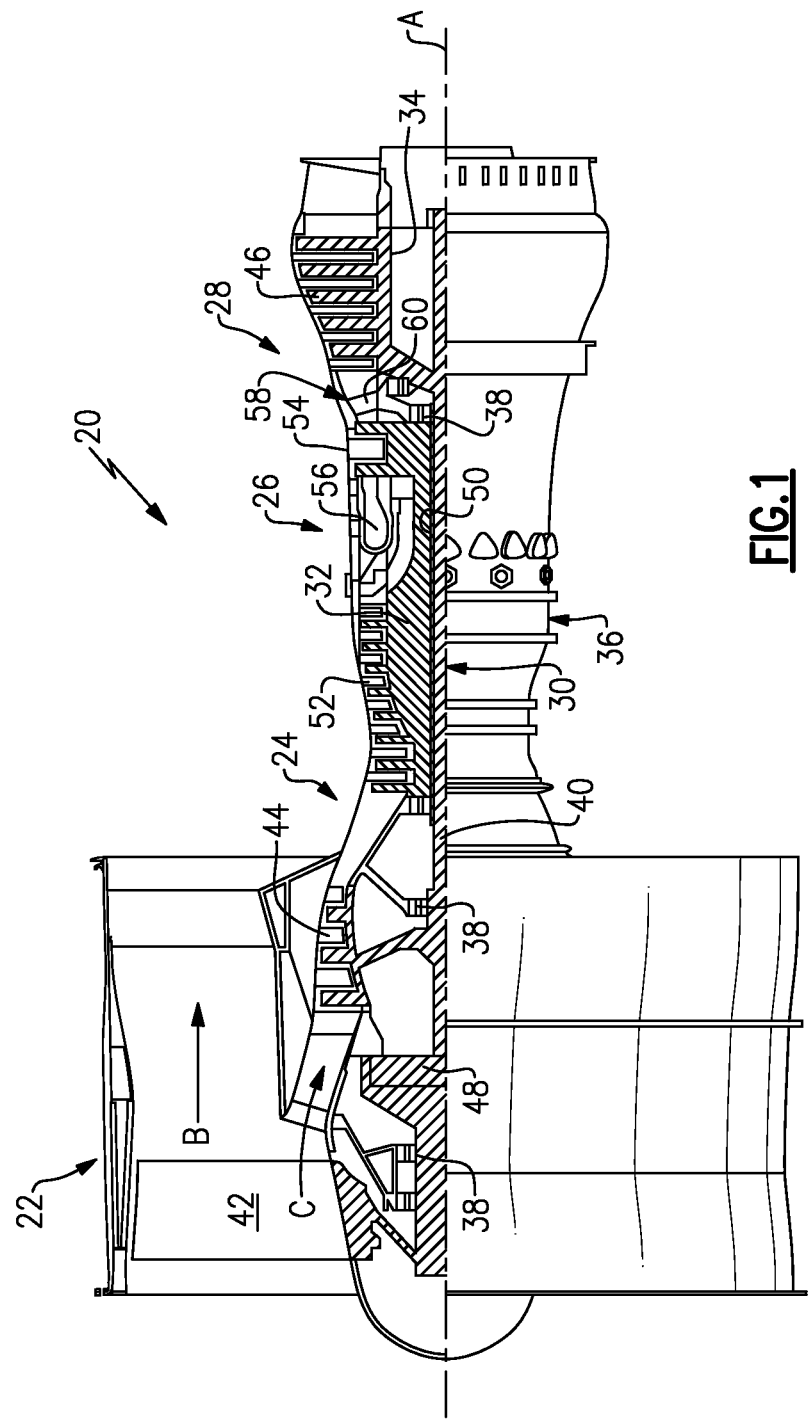
FIG. 1 schematically illustrates an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(\text{Tram }^\circ \text{R})/(518.7^\circ \text{R})]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2A:
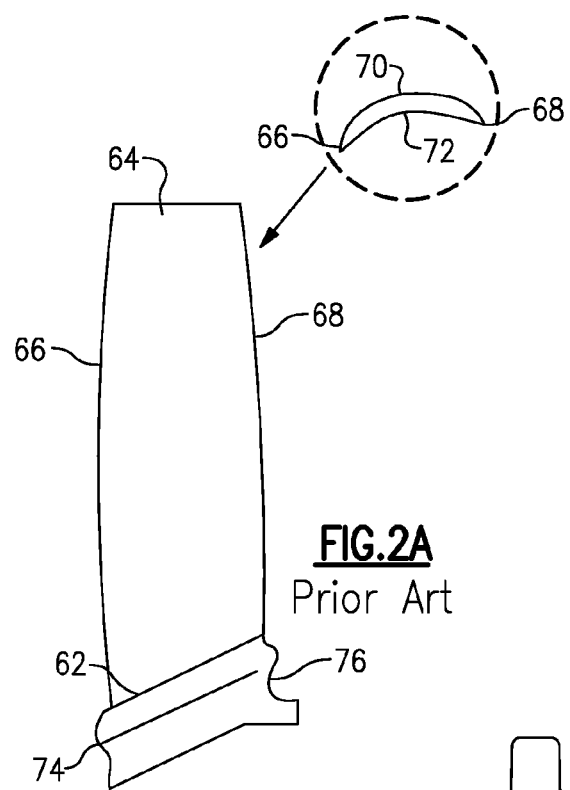
FIG. 2A shows a known rotor blade.

A prior art blade of the fan 42 is illustrated in FIG. 2A. The blade has an airfoil 64 extending radially outwardly from a dovetail 62. A leading edge 66 and a trailing edge 68 define the forward and rear limits of the airfoil 64. The airfoil 64 has a suction side 70 and a pressure side 72. Ends 74 and 76 of the dovetail 62 can be seen to be relatively complex.

Figure 2B:
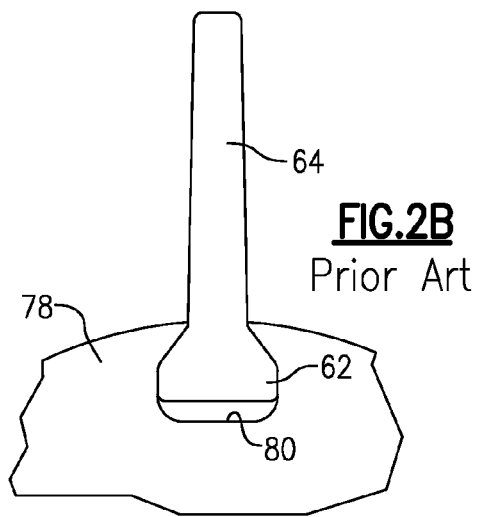
FIG. 2B shows a section view of the known rotor blade of FIG. 2A within a rotor.

As shown schematically in FIG. 2B, a rotor 78 of the fan 42 receives the dovetail 62 in slot 80 to mount the blade with the airfoil 64 extending radially outwardly from the engine centerline. As the rotor 78 is driven to rotate, it carries the blade with it.

Figure 2C:
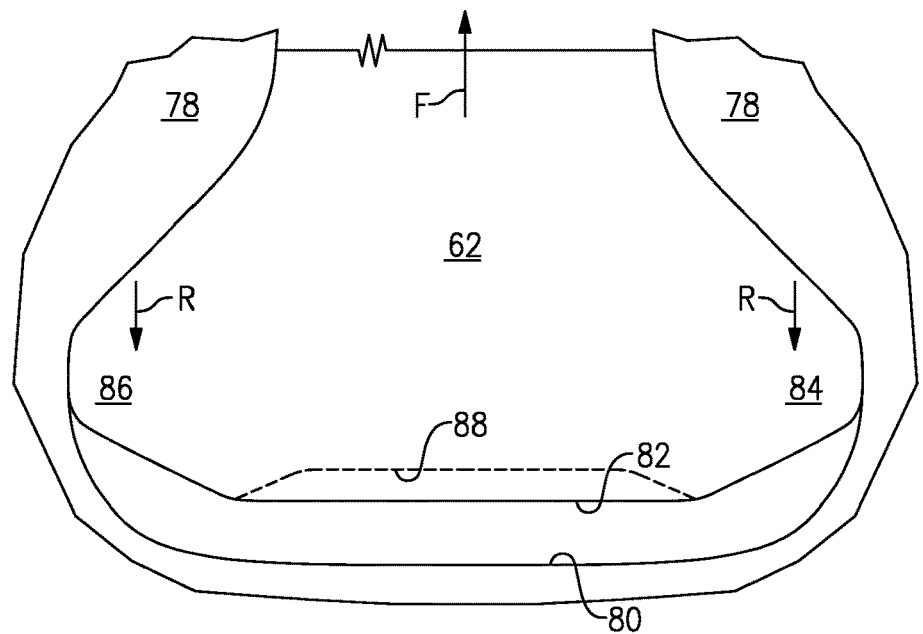
FIG. 2C shows a problem that occurs with dovetails of the known rotor blade.

FIG. 2C shows a feature with the known dovetails 62. As shown a portion of the bottom surface 82 is relatively flat. When under load, a centrifugal force F urges the dovetail 62 radially outwardly. This results in the circumferential outer edges 84 and 86, which abut surfaces of the rotor 78, being forced radially inwardly by a reaction force R. This causes the flat bottom surface 82 to distort or bow upwardly as shown at 88. The amount of bowing is exaggerated for illustration purposes. This bowing increases stresses of the blade incorporating this dovetail 62. Also, the bowing can affect the blade having the dovetail 62 if impacted, such as in a bird strike.

Hollow fan blades formed from aluminum, and other types of fan blades (including solid blades), may include the dovetail 62 to secure the blade to the disk or rotor 78. Blades that are not fan blades may also include the dovetail 62. It is desired to improve impact capability under bird strike and fan blade out loads.

Figure 3:
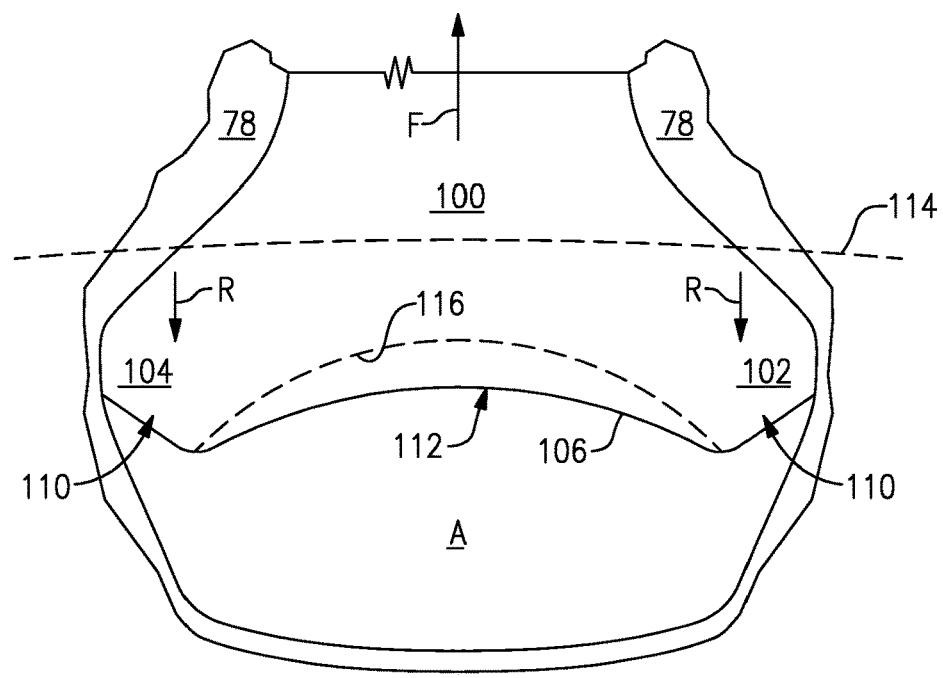
FIG. 3 shows a new dovetail

FIG. 3 shows a novel dovetail 100. Dovetail 100 sees the centrifugal force F as mentioned above. There are reaction forces R associated with the edges 102 and 104. However, a portion of the bottom surface 106 is concave. That is, it is formed along a curve, such that circumferential outer edges 110 of the bottom surface 106 are relatively thicker than a circumferentially central portion 112. The relative thickness may be determined relative to a circumferential reference line 114 that is a consistent radial distance from the axis of rotation of the rotor 78.

During operation, the bottom surface 106 permits the dovetail 100 to bow as shown at 116. The bow 116 is greater that the bow 88 of the illustrated prior art dovetail 62. Due to the bow 116, a blade having the disclosed dovetail 100 moves radially outboard more than the flat bottom surface 82 of the illustrated prior art dovetail 62 at an equivalent rotational speed.

The bow 116 may cause the position of the associated blade to vary radially during operation. Increasing the amount of bow 116 effectively lengthens the blade radially. The bow 116 is greatest at higher rotational speeds due to the higher centrifugal forces. The blade thus is closer to annular sealing structures surrounding the blade at higher rotational speeds. This characteristic effectively provides increased efficiency via a passively modifiable blade tip clearance. This characteristic may be particularly applicable if the dovetail 100 is constructed of relatively high-performance materials.

The concavity of the bottom surface 106 results in the dovetail 100 having less material than the illustrated prior art dovetail 62. The disclosed dovetail 100 effectively experiences more stress while desirably reducing weight versus the illustrated prior art dovetail 62. Due to experiencing more stress, there is a larger option of materials for forming the dovetail 100 as compared with the more rigorous requirements of the prior art illustrated prior art dovetail 62. Experiencing more stress is advantageous, in some examples, if the material of the dovetail 100 is higher quality than the material of the rotor 78 such that the blade may fracture before the rotor 78.

In addition, as can be appreciated, blade failure is typically less disruptive than rotor failure. During a bird strike, for example, the blade with the dovetail 100, which has less material than the illustrated prior art, may be more likely to fail than the rotor 78. In some examples, the rotor 78 may be formed of a stronger material than the dovetail 100 so that the rotor 78 is less likely to fail than the blade.

While a bottom surface 106 that is concave is disclosed, it is possible to achieve similar benefits with a triangular surface, or some other constantly decreasing surface, which decreases until reaching a circumferentially central point 112. That is, there may be other shapes which provide a dovetail bottom surface wherein the circumferentially central portion 112 extends further radially outboard than the circumferential outer edges of the dovetail.

While the bottom surface 106 may decrease to its smallest point at the circumferential center, the smallest point may be spaced closer to one edge. However, that smallest point would still be "central" in that it will be spaced towards the center from the most adjacent edge. In this example, the circumferential center is further from a rotational axis of the rotor than any other portion of the bottom surface.

While the application discloses a fan blade, there may be benefits in other blades using such a dovetail. As an example, compressor blades or turbine blades for gas turbine engine applications may use such a dovetail.

Figure 4:
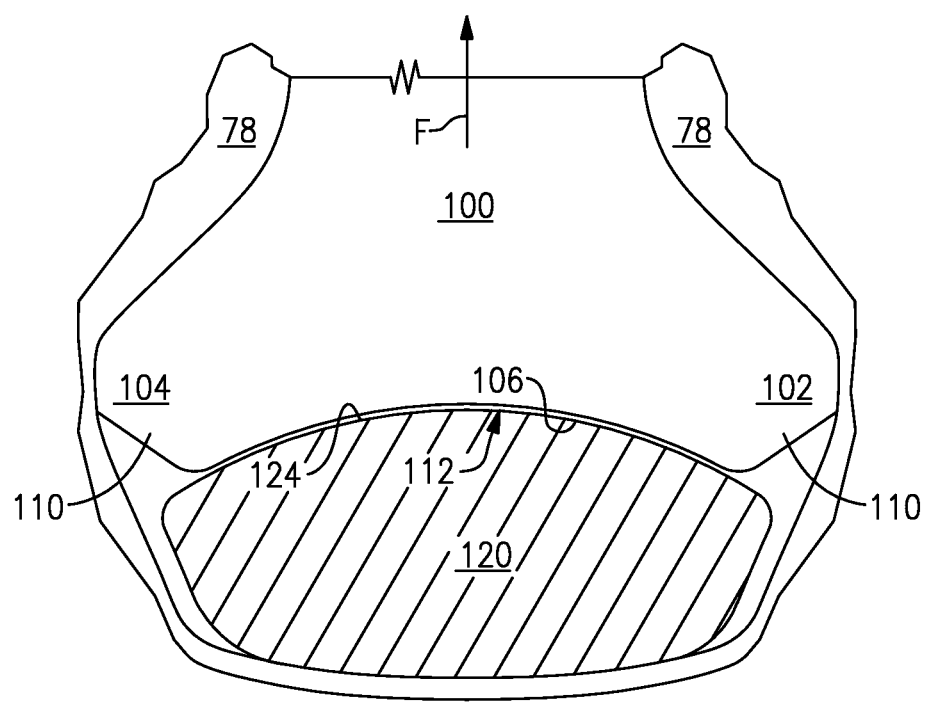
FIG. 4 shows the new dovetail of FIG. 3 with a spacer.

Referring to the embodiment of FIG. 4, with continuing reference to that of FIG. 3, a spacer 120 is inserted with the open area A between the bottom surface 106 and the rotor 78. The example spacer 120 includes a radial outer surface 124 matching a contour of the bottom surface 106 of the dovetail 100. The bottom surface 106 is concave prior to any loading.

The example spacer 120 acts as a biasing member (or spring) to hold the dovetail 100 of the blade radially outward against the rotor 78 while the rotor 78 is not rotating. The biasing force lessens the impact of the blade to the rotor 78 during an impact event. That is, if the spacer 120 reaches is maximum spring force, it can break apart, but will have absorbed some of the impact energy potentially saving the blade from damage or the rotor 78 from damage. The spacer 120 can inhibit galling or other wear between the rotor 78 and the dovetail 100 of the blade. The spacer 120 further facilitates installation and removal of the blade by allowing for a relatively loose fit between the blade and rotor 78 (when the spacer 120 is removed). The spacer 120 may be constructed of a material that is relatively inexpensive when compared to the material of the blade.

The disclosed dovetail proposals typically apply to aluminum blades, but may apply to any hybrid metallic or singular metallic fan blades. Such singular metallic materials include, e.g., aluminum, titanium, other known alloys, etc.

Although described with reference to the fan 42, the teachings of this disclosure may be applied to any mechanical blades for any stage of the engine 20, including any stage of the compressor section 24 and the turbine section 28.

Although example embodiments have been disclosed, one of ordinary skill in this art would recognize that certain modifications would come within the scope of this disclosure.

The invention claimed is:

1. A rotor assembly comprising:
   a rotor;
   a blade including a radially inner dovetail disposed adjacent the rotor and supporting a radially outer airfoil emending out way from the rotor;

the dovetail having a maximum width and having three radially inner bottom surfaces and a radial thickness, the radial thickness being less in a circumferentially center portion of the dovetail than circumferentially opposing outer edges, the circumferentially center portion of the dovetail defining one of the radially inner bottom surfaces that has a single concave shape;

a spacer disposed radially between the one radially inner bottom surface of the dovetail having the single concave shape and the rotor, the spacer including a radial outer surface matching a contour of the single concave shape of the one radially bottom surface of the center portion of the dovetail so that the radially outer surface of the spacer is received into and engagingly fitted against the single concave shape of the one radially inner bottom surface of the dovetail, the spacer further including two planar outer surfaces and a radially inner surface having a convex shape opposed from the radially outer surface, the two planar outer surfaces being spaced apart and respectively disposed intermediate the radially outer surface and the radially inner surface having the convex shape, and the radial outer surface of the spacer spans along a majority portion of the maximum width of the dovetail, wherein the respective other two radially inner bottom surfaces of the dovetail constantly decrease from the circumferential outer edges of the dovetail in an inbound direction of the dovetail to directly transitionally connect to the one radially inner bottom surface of the dovetail having the single concave shape.

2. The rotor assembly of claim 1, wherein the dovetail is formed of a material that differs from a material of the rotor.

3. The rotor assembly of claim 2, wherein the rotor defines a slot dimensioned to receive the dovetail, the spacer includes the radially inner surface having the convex shape that matches a contour of the slot, and the two planar sidewalls each slope inwardly from the radial outer surface toward the radially inner surface with respect to an inbound direction of the spacer.

4. The rotor assembly of claim 1, wherein the one radially inner bottom surface of the dovetail having the single concave shape is furthest from a rotational axis of the rotor at the circumferentially center portion of the dovetail.

5. The rotor assembly of claim 1, wherein the blade is a fan blade.

6. A fan comprising:
a fan rotor having a plurality of slots, with the slots each receiving a fan blade;
the fan blades including an airfoil extending radially outwardly of a dovetail, the dovetail having a radial thickness which is less in a circumferentially center portion of the dovetail than circumferentially opposing outer edges, the circumferentially center portion of the dovetail including a radially inner surface having a single concave shape;
a spacer disposed radially between the radial inner surface of the dovetail and the fan rotor, wherein the spacer includes a radial outer surface matching a contour of the single concave shape of the radial inner surface of the dovetail so that the radially outer surface of the spacer is received into and fitted against the single concave shape of the radially inner surface of the dovetail; and
wherein the spacer includes a second radially inner surface having a convex shape that matches a contour of a respective one of the plurality of slots, the second radially inner surface opposed to the radial outer surface of the spacer, and the spacer includes opposed planar sidewalls that respectively slope inwardly from the radial outer surface toward the second radially inner surface.

7. The fan of claim 6, wherein a bottom surface of the dovetail decreases constantly from the circumferential edges to the circumferentially central portion.

8. The fan of claim 6, wherein the fan rotor is formed of a first material and the dovetails is formed of a second material that differs from the first material.

9. The fan of claim 6, wherein the spacer defines a spring force such that the spacer loads against the radial inner surface of the dovetail during rotation of the fan rotor.

10. The fan of claim 9, wherein the fan blade is a constructed of a first material, and the spacer is constructed of a second material that differs from the first material.

11. The fan of claim 10, wherein the fan blade delivers a portion of airflow to a bypass flow path and another portion of airflow to a core flow path defined by a compressor section during rotation of the fan rotor.

12. A method of interfacing a dovetail and a fan rotor, comprising:
providing the fan rotor with a plurality of slots, with the slots receiving a fan blade, and the tan blades including an airfoil extending radially outwardly of the dovetail, the dovetail having a radial thickness which is less in a circumferentially center portion of the dovetail than circumferentially opposing outer edges, the circumferentially center portion of the dovetail including a radially inner surface having a single concave shape;
positioning a spacer radially between the radial inner surface of the dovetail and the fan rotor, the spacer loading against the radial inner surface of the dovetail during rotation of the tan rotor, and wherein the spacer includes a radial outer surface matching a contour of the single concave shape of the radial inner surface of the dovetail so that the radially outer surface of the spacer is received into and fitted against the single concave shape of the radially inner surface of the dovetail; and
wherein the spacer includes a second radially inner surface having a convex shape that matches a contour of a respective one of the plurality of slots, the second radially inner surface opposed to the radial outer surface of the spacer, and the spacer includes opposed planar sidewalls that respectively slope inwardly from the radial outer surface toward the second radially inner surface.

13. The method of claim 12, wherein the radial inner surface of the dovetail defining the single concave shape is concave when the dovetail is not loaded.

14. The method of claim 13, wherein the fan blade is a constructed of a first material, and the spacer is constructed of a second material that differs from the first material.

* * * * *